United States Patent [19]

Miyake et al.

[11] 3,899,604

[45] Aug. 12, 1975

[54] PROCESS FOR THE PRODUCTION OF FOODS AND DRINKS WITH THE EMPLOYMENT OF MALTOBIONIC ACID

[75] Inventors: Toshio Miyake; Yoshinori Sato, both of Okayama, Japan

[73] Assignee: Hayashibara Company, Okayama, Japan

[22] Filed: Sept. 20, 1973

[21] Appl. No.: 399,097

Related U.S. Application Data

[63] Continuation of Ser. No. 94,526, Dec. 2, 1970, abandoned.

[30] Foreign Application Priority Data

Dec. 4, 1969 Japan.............................. 44-97374

[52] U.S. Cl. ................ 426/590; 426/605; 426/660; 426/650
[51] Int. Cl.² ... A23L 1/26; A23L 1/02; A23L 1/24; A23G 3/00
[58] Field of Search ....... 426/48, 65, 175, 183, 190, 426/191, 213, 227, 214, 365, 366, 196, 206, 221

[56] References Cited

UNITED STATES PATENTS 2,496,297  2/1950  Lockwood et al. .................... 195/96
3,372,036  3/1968  Eltz ................................. 426/183 X

OTHER PUBLICATIONS

Stodola et al., *The Oxidation of Lactose & Maltose to Bionic Acids by Pseudomonas*, J. of Biol. Chem., 171, 1947, p. 213–220.

*Primary Examiner*—Raymond N. Jones
*Assistant Examiner*—Esther L. Massung
*Attorney, Agent, or Firm*—Browdy and Neimark

[57] ABSTRACT

The present invention relates to a process for the production of foods and drinks with the employment of maltobionic acid, an oxidation product of disaccharide (maltose).

5 Claims, No Drawings

PROCESS FOR THE PRODUCTION OF FOODS AND DRINKS WITH THE EMPLOYMENT OF MALTOBIONIC ACID

This is a continuation of application Ser. No. 94,526, filed Dec. 2, 1970, now abandoned.

The present invention relates to a process for the production of foods and drinks with the employment of maltobionic acid, an oxidation product of disaccharide (maltose).

Conventionally, vinegar was used as an acid for the production of foods, whereas for the production of confectioneries, various acids, such as citric acid, tartaric acid, succinic acid, lactic acid, and fumaric acid, were employed. Vinegar, which has been used for cooking in general, is a volatile liquid and has a highly irritating smell. Since it is only available in liquid form, vinegar has an inconvenience of handling; therefore incorporation into foods of solid or powdered form causes difficulty. On the other hand, citric acid, succinic acid and tartaric acid are available as solids which is an advantage in incorporation into various types of powdered foods, however has a disadvantage of being expensive, in contrast, among the aldonic acids derived from sugars gluconic acid is partially used in foods. The taste of this product is not in every respect desirable. Therefore its employment has not increased.

The inventors have previously succeeded in the development of a practical process applicable for the industrial production of maltose from starch with the employment of an enzymatical method. Successively they developed a process for the production of maltobionic acid by enzymatical oxidation of maltose. Maltobionic acid containing maltotrionic acid, or oligosaccharides, such as maltose and maltotriose is producible according to the present invention. The maltobionic acid according to the invention has favorable acidity and flavor, and is most preferable for the production of foods and drinks. The characteristics of this product are as follows.

1. The maltobionic acid is a product with desirable acidity and can be formed into powder. Therefore the product is applicable for the production of powdered or solid candies and drinks formulas.

2. The acidity of the product is of a mild degree; an acidity similar to citric and tartaric acids. In addition the product has a preferable taste most desirable for candies, mayonnaise and cooking purposes.

3. The molecular weight of maltobionic acid is several times higher than that of other acids, and in addition possesses properties similar to sugars. Maltobionic acid is characterized in that it increases and improves the body and viscosity of the products to which it is incorporated.

4. Modifications of maltobionic acid in order to have desirable constituents of maltose, maltotriose and other oligosaccharides are possible without great variation of the process according to the present invention. In addition the final flavor of the maltobionic acid product is controllable by increasing the content of maltotrionic acid. Therefore, acidity, sweetening power, and viscosity of the maltobionic acid product are controllable to the preferable degrees. Results of acidity and palatability tests conducted by panel methods will be described hereinafter.

I. Intensity of Acidity

The acidity of maltobionic acid was compared with those of other acids, using the former as a control.

Methods of Panel Test: Questionnaire Replies filled in questionnaries, closed Panel.

Room of Panel Test: Panel Room, Department of Domestic Science, Notre Dame Seishin Women's University, Okayama, Japan.

Number of Panel Members: 20, persons who had normal sensibility for sweet and acidity tests.

Subject: Investigation of the existence of acidity in maltobionic acid and its intensity and similarity compared to those other acids.

Samples: Samples were prepared with each acid with concentrations of 2.45 % (dry solid).

Experimental Method: Significant difference determination between two varieties of acids.

Results: Given in the following table.

1. Intensities

|  | Acetic acid | Lactic acid | Malic acid | Citric acid | Tartaric acid |
|---|---|---|---|---|---|
| Weaker than the control | 0 | 0 | 0 | 0 | 0 |
| Stronger than the control | 20 | 20 | 20 | 20 | 20 |

2. Similar acidity agents

|  | Acetic acid | Lactic acid | Malic acid | Citric acid | Tartaric acid | No response |
|---|---|---|---|---|---|---|
| Number of members | 3 | 1 | 1 | 12 | 2 | 1 |
| % | 15 | 5 | 5 | 60 | 10 | 5 |

As shown is the above tables, the acidity of maltobionic acid was found weaker than any other acid and in addition the quality of its acidity similar to that of malic acid or acetic acid. For the purpose of comparing the acidities of acids, a 2.45 % aqueous maltobionic acid solution was prepared and compared similarly with solutions of other acids with concentrations of 2, 1.5 and 1 %, resulting in not approaching same stimulus threshold. Therefore comparisons were made with lower concentration solutions; 0.6, 0.42, 0.3, 0.18 and 0.06 %.

Samples used for comparisons: Acetic acid, citric acid, malic acid, lactic acid and tartaric acid.

Methods of Panel Tests: Replies filled in questionnaires closed panel.

Number of Panel Members: 16

RESULTS AND DISCUSSION

On comparisons tests with citric acid, a 0.26 % citric acid solution was found equivalent to a 2.5 % bionic solution.

Lactic acid: 0.12 % was confirmed as a stimulus threshold of bionic acid.

Malic acid: Identical as above.

Acetic acid: 0.3 % was found to be the stimulus threshold of bionic acid.

Tartaric acid: 0.12 % was found to be the stimulus threshold of bionic acid.

II. Grade of Acidities of Acids and the Coeffective and Offset Effects with Varieties of Seasonings Test Method: Closed Panel Number of Panel Members: 15

Subjects:
1. Investigation on the grade of acidity of said acidity agent.
2. Findings on coeffective and offset effects of said acid used with substances with sweetening constituents.

Samples:
1. For acidity grade test, a 2.4 % aqueous maltobionic acid solution.
2. Seasoning solutions.

|  | Ajinomoto | Inoichiban | Takasago | Sodium L glutamate | Maltobionic acid |
|---|---|---|---|---|---|
| 2.4 % Maltobionic acid solution | 200 ml | 200 ml | 200 ml | 200 ml | 200 ml |
| NaCl | 1.0 g | 1.0 g | 1.0 g | 1.0 g |  |
| Component | 0.2 g | 0.2 g | 0.2 g | 0.2 g |  |

Two samples heated to 40°C and two not heated were prepared with each solution.

RESULTS

1. Grades of acidity

|  | Very unsavory | Fairly unsavory | Moderate | Fair | Excellent |
|---|---|---|---|---|---|
| Points | −2 | −1 | 0 | +1 | +2 |
| Number of members |  | 2 | 5 | 8 |  |
| Total points |  | −2 | 0 | +8 |  |

As a total point of six was obtained maltobionic acid was determined as giving a desirable impression. Maltobionic acid is furtherly characterized in having an acidity that disappears instantly, rendering lightness and having no disagreeable taste. Therefore the product is a bland acidity agent with no offensive or astringent taste.

2. The coeffective and offset effects when used with seasonings

|  |  | Ajinomoto | Inoichiban | Takasago | Sodium-D, L-glutamate |
|---|---|---|---|---|---|
| Not heated | Control more desirable | 8 | 7 | 5 | 6 |
|  | Control more undesirable | 7 | 8 | 10 | 9 |
|  | Significant difference | none | — | — | — |
| Heated 20 to 40°C | Control more desirable | 7 | 6 | 3 | 4 |
|  | Control more undesirable | 6 | 7 | 10 | 9 |
|  | Significant difference | — | — | — | — |

As shown in the above table special coeffective and offset effects can not be expected.

III. Cooking Tests with the Employment of Maltobionic Acid
1. Hashed cucumber seasoned with vinegar
2. Japanese style soup
3. Vegetable salads (cucumber and lettuce)

1. Hashed cucumber seasoned with vinegar.
Method of Panel test: Open panel test
Panel Members: Number of members, 15; Panel leaders, 2, (20–21 aged women, respectively)
Materials used for the tests:

| A (for 5 persons) |  | B (for 5 persons) |  |
|---|---|---|---|
| Cucumber | 70 g | Cucumber | 70 g |
| Stick of bean jelly | 30 g | Stick of bean jelly | 30 g |
| Mannen Vinegar (commerical malt vinegar) | 2 large spoonful | Maltobionic acid | 2 large spoonful |
| Soy | 2 large spoonful | Soy | 2 large spoonful |
| Sugar | 1 small spoonful | Sugar | 1 small spoonful |
| Salt | few | Salt | few |
| Ajinomoto (Sodium glutamate | few | Ajinomoto (Sodium glutamate) | few |

Maltobionic acid solution, concentration 49.1 % was used. Level of desirabilities were replied in the questionnaries by stating one of the following degrees, similar, slightly different, considerably different and extremely different. In addition, the members were directed to state the characteristics of said acidity agent.
Results of collecting the questionnaires
1. Those who found A desirable: 7 (Mannen vinegar used) Those who found B desirable: 10 (said acidity agent used) No significant difference was shown between A and B. This fact may be owed to the difference of desirability.
2. Analytical survey according to usual methods of grading in four stages 0, 1, 2 and 3, resulted in the absence of difference between A and B.
3. The characteristics of said acidity agent are as follows. Bland taste, Mild acidity, desirable after taste, light and mild acidity, etc.

2. Japanese style soup
Method of Panel test: Open panel test
Number of Panel test members: 8
Materials: As listed in the following table.

|  | A | B |
|---|---|---|
| Broth | 400 ml | 400 ml |
| Soy | few | few |
| Salt | few | few |
| A light cake of wheat gluten | 5–8 pieces | 5–8 pieces |
| Inoichiban | few | few |
| Maltobionic acid | few drops | Mannen vinegar few drops |

Notes:
Broth was prepared with Inoichiban and extract of dried bonito.

Methods of Test: Paired preference test

RESULTS

All members found that the Japanese soup in which said acidity agent was used desirable. The soup in which Mannen Vinegar was used had a lasting taste and the vinear was found to cause an undesirable taste of the soup.
3. Vegetable salad
Name of dish: Vegetable salad with dressing
Number of Panel test members: 8

Method of Panel test: Open panel test
Material: 2–3 leaves of lettuce and 100 g of cucumber were used in the preparation of A and B.

|  | Dressing A | Dressing B |
|---|---|---|
| Salad oil | 2 large spoonful | 2 large spoonful |
| Said acidity agent | 2 large spoonful | Mannen vinegar 2 large spoonful |
| Salt | few | few |
| Pepper | few | few |
| Ajinomoto | few | few |

Preparations:
1. The lettuce were washed in water and torn. The cucumber was sliced thinly and immersed in water to be crispy.
2. Dressing A and B were prepared and applied on material 1.

Results:
The acidic taste of Dressing A was found too light and it was necessary to increase its amount to make the dressing desirable. Upon evaluating the above results obtained on cooking, it was demonstrated that the employment of said acidity agent was effective in the preparation of salad dressing. Therefore further panel tests were performed on mayonnaise using said acidity agent.

1. 1. test on vegetable salad. Items used in the tests
   A. Vinegar (mannensu brand)
   B. Maltobionic acid
   C. Vinegar + maltobionic acid (50 : 50)
   D. Malic vinegar
   E. Maltobionic acid + malic acid (50 : 50)

Purpose of conducting the panel tests. Grading of desirabilities of the mayonnaise in which the 5 items are used.
Material:

| Item | Amount |
|---|---|
| Apple | 450 g |
| Lettuce | 80 g |
| Mayonnaise | 2 large spoonful |

Preparation:
The lettuce was washed in water, the water was removed completely and apples was washed and sliced. The lettuce was torn into small pieces and mixed with spices to adjust its taste and admixed sufficiently with one of the mayonnaise.

Ingredients used in the preparation of mayonnaise:

| Material | Amount |  |
|---|---|---|
| Salad oil | 75 | g |
| Vinegar* | 10.8 | g |
| Egg yolk | 9 | g |
| Sugar | 2.5 | g |
| Salt | 1.5 | g |
| Mustard | 1 | g |
| Pepper | 0.2 | g |

*Vinegar used is one of the following, A, Mannensu; B, Maltobionic acid; C, Mannensu vinegar + maltobionic acid (50:50); D, Malic acid; E, Maltobionic acid + Malic acid (1:1).

The mayonnaises were prepared mixing thoroughly egg yolk, mustard, spices in a bowl. A small amount of oil was added with stirring with a beater.

Collection Data:
The data were collected and calculated by the scoring test. The total of data from 30 panel members were as follows.

| Item | A | B | C | D | E |
|---|---|---|---|---|---|
| Total points | −25 | 2 | 3 | −19 | −12 |

A: The mayonnaise prepared with mannensu was found undesirable.
B: The mayonnaise prepared with a 80 % solution of maltobionic acid had no undesirable taste but a delicious and bland taste.
C: Those who gave responses that salad applied a mixture of maltobionic acid and Mannensu vinegar, 70 %, and those unfavourable one person, 3 %.
E: The mayonnaise which was a mixture of maltobionic acid and malic acid was found and delicious.

From the above results there was no significant difference between B and C. Thus the mayonnaise were graded $$C > B > E > D$$

in the order of desirability.

| C | B | E | D |
|---|---|---|---|
| (maltobionic acid + mannensu) | (maltobionic acid) | (malic acid + maltobionic acid) | (malic acid) |

2. Panel test on potato salad
Items used in the tests: same as described in D
Method of panel tests: open panel tests
Members of panel tests: 2 panel leaders 29 members
Material:

| Item | Amount |
|---|---|
| Potato | 500 g |
| Cucumber | 50 g |
| Carrot | 38 g |
| Mayonnaise | 2 large spoonfuls |

Preparation:
Potatoes were washed in water, peeled and boiled. Carrots were sliced into small pieces. The boiled potatoes were cut into cubes. Thinly sliced cucumbers and carrots were seasoned with salt, mustard and mayonnaise by mixing in a bowl.

The ingredients and their amounts were as in the Example.

Analysis of Data:
Results obtained on calculating the responses of A, B, C. D and E.

|                                 | A  | B  | C  | D  | E  |
|---------------------------------|----|----|----|----|----|
| Total points given by 30 members | −6 | −3 | 10 | −7 | −2 |

Salad consisting of maltobionic acid and Mannensu vinegar was found delicious. The salad giving a great popularity had a satisfactory acidity and no unfavorable taste. The salad which won second place in popularity was E, consisting of maltobionic acid and malic vinegar. The high desirability of maltobionic acid was an effective factor in giving the popularity. In addition the bland taste without undesirable taste exhibited its desirability among the young generation. Determination of the degree of desirability according to usual methods resulted as follows.

$$C, \begin{pmatrix} \text{maltobionic acid} \\ + \text{vinegar} \end{pmatrix} > B, \begin{pmatrix} \text{maltobionic} \\ \text{acid} \end{pmatrix}$$
$$> A, \quad (\text{vinegar}) \quad > E, \begin{pmatrix} \text{maltobionic acid} \\ + \text{malic acid} \end{pmatrix} > D, \begin{pmatrix} \text{malic} \\ \text{acid} \end{pmatrix}$$

As shown in the above table, the mayonnaise, in which maltobionic acid is present, was very delicious, bland tasting and preferable for heavy seasoning.

The above results proved that the acidity of maltobionic acid suited the general desirabilities when used singly. Moreover, maltobionic acid which comprises oligosaccharides or some amounts of dextrins prepared from maltose or by oxidation of maltose containing starch syrups, harmonizes favorably with the sweetness of oligosaccharides and was found suitable in the confectionery field. The present invention will be illustrated further with examples of preparations of drinks, candies etc.

EXAMPLE 1-A

Process for the production of maltobionic acid from maltose

To a sweet potato starch slurry with a concentration of 30 % was added 0.1 % of liquefying enzyme at pH 6.0 and 90°C under continuous heating and agitating conditions to give a liquefied solution with a dextrose equivalent (D.E.) of 5.0. The product was cooled rapidly to 50°C and then incubated with admixing of 30 units of enzyme extracted from fresh sweet potato (β-amylase) and 25 units of α-1,6-glucosidase per gram starch respectively at 45°C for 35 hours. Thus a sugar solution with a maltose content of 90 % was obtained. The sugar solution was incubated at 30°C with 20 mg of cultured cells of Pseudomonas gravlolens (IFO 3460) per gram maltose according to said specification under aeration condition. The incubation was discontinued after 30 hours. The pH of the reaction solution was adjusted by adding calcium carbonate. The solution was subsequently purified with active carbon and cation exchange resin. The main constituent of the product was 90 % maltobionic acid, the remainder being maltotrionic acid and oligosaccharides. The product exhibited an acidity with a heavy body. The maltobionic acid in accordance with the present invention is maltobionic acid of the following formula:

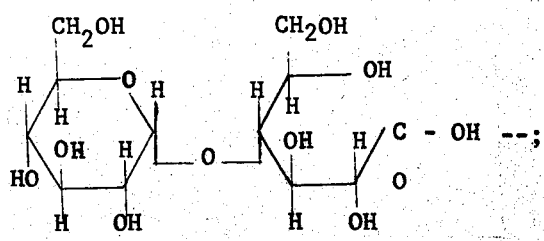

EXAMPLE 1-B

Maltose containing bionic acid

The said enzymatical oxidation reaction described in (A) was discontinued after 15 hours. Thus a purified solution containing 71 % bionic acid, and in which maltose, oligosaccharide and dextrins were present, was obtained. The product was condensed following purification with active carbon and cation exchange resin, thus an acid with a relatively high sweetness was obtained.

EXAMPLE 1-C

A commercially available high maltose syrup (maltose content, 49 %) was oxidized sufficiently as described in (A). The resultant acid product contained 50 % of maltobionic acid, as well as maltotrionic acid, oligosaccharides and dextrins was obtained. The product was purified employing active carbon and cation exchange resin, then condensed.

EXAMPLE 1-D

High maltose syrup (maltose content, 49 %) was oxidized as described in (A). After 2 hours of oxidation a syrup of which 70 % of the maltose of the original syrup was oxidized was obtained. The product was purified and condensed similarly to give a syrup with a high acidity.

EXAMPLE 2

Process for the production of hard candy

To the A fraction of Example 1, was added an equivalent amount of sucrose and subjected to a reduced pressure of 700 mm Hg at 130°C. To the product was added flavoring agent and coloring agent on a cooling plate, then the product was formed with a roller at 80°C and cooled. The product harmonized desirably with the sweetness of sucrose and maltose and to the bland acidity of bionic acid and displayed a refreshing taste with a desirable after taste. Especially the addition of organic acids was not necessary and its taste was extremely mild. Since the A fraction itself used in the blending contained oligosaccharides, had desirable crystallization preventive properties and in the acid itself had a high molecular weight, a product with an excellent transparency and a desirable biting property, and which showed no increase of humectancy was obtained. In addition, care should be taken in mixing syrup with the highest concentration as possible, in conducting the finishing procedure in the shortest period as possible, and cooling the product to prevent inversion of sucrose, owing to the fact that organic acids were added according to this method.

EXAMPLE 3

Process for the production of concentrated orange juice

Replacement of acids and sugars with said acidity agent in the production of orange juice provides products of refreshing and with no undesirable acidic taste. The additions of maltose and maltotriose are helpful in producing products with desirable after taste as well as production of crystallization of sucrose. In addition it is possible to elevate the concentration degrees of the products. An example formula is as follows.

| Ingredients | | |
|---|---|---|
| Concentrated fruit juice | Be 55° | 1000 g |
| A fraction | Be 55° | 1000 g |
| Emulsifying flavor | | 50 ml |
| Orange essence | | 150 ml |
| Color | | 3 g |
| Base | | 2200 g |
| Base | | 2.2 kg |
| Sucrose | | 10 kg |
| Maltobionic acid (D in Example 1) | | 2 kg |
| Water | | 15 kg |
| Total weight | | 24.2 kg |

EXAMPLE 4

Process for the production of powdered juice 100 parts of sifted dextrose anhydrate and 20 parts of acidic agent (dry powder, moisture content, 1.8 %) according to A of Example 1, were mixed sufficiently. The mixture was seasoned with adding a small amount of sodium glutomote and admixed with 1.3 parts of powdered flavor. The mixture was then colorized by spraying coloring agent of high concentration, then the mixture was thoroughly mixed and dried. Subsequently the larger particles were removed by sifting. The product had a refreshing taste resulting from the admixing of dextrose with the oligosaccharides present in said acidic agent. In addition the product exhibited a deep sweetness which harmonized desirably with the acidic taste of bionic acid. Thus a juice with a refined taste was obtained.

EXAMPLE 5

To 100 parts of the B fraction described in Example 1 was admixed 50 parts of dextrose crystalline or maltose. The mixture was formed into tablets of desirable size with a tableting machine following addition of a small amount of fruit essence. The tablets were subsequently colored and polished when necessary. Addition of dextrins with using C or D fraction as well as B fraction is possible to provide varieties of flavor of the products. The process provides a digestible product, which is unharmful to human bodies, and has a refreshing acidic taste and a desirable sweetness not as excessive as in the case when sucrose is used.

EXAMPLE 6

Fraction A or B described in Example 1 was concentrated to 70 %, 5 % of filtered lemon juice (the condensed fraction per material) or a desirable amount of lemon essence was added to the concentrated solution. The flavor and taste of the mixture was adjusted with addition of 3 % of citric acid. The about 5 times diluted solution obtained by dissolving the mixture in water had a refreshing and pleasant acidic taste, and a slight sweetness, but displayed no astringent after taste. When the diluted product was mixed into other beverage as a lemon liquid, it was found that said product imparted a refreshing acidic taste and flavour.

What is claimed is:

1. In a food product to which an additive is customarily added to provide an acid taste, in improvement wherein said food product contains, as the additive for providing said taste, maltobionic acid in an amount sufficient to provide an acid taste to the food product.

2. A method of imparting an acid taste to food products to which a component is customarily added to provide an acid taste which comprises:
    adding unsubstituted maltobionic acid as the sole additive for providing said acid taste to the food products said acid being in a quantity sufficient to provide an acid taste thereto.

3. A food product according to claim 1 wherein the food product is mayonnaise.

4. A food product according to claim 1 wherein the food product is orange juice.

5. A food product according to claim 1 wherein the food product is candy.

* * * * *

UNITED STATES PATENT OFFICE
CERTIFICATE OF CORRECTION

PATENT NO. : 3,899,604
DATED : August 12, 1975
INVENTOR(S) : Toshio MIYAKE et al It is certified that error appears in the above-identified patent and that said Letters Patent are hereby corrected as shown below:

Column 3, line 56-58 (in the third table, first column) should read:  --Heated to 40°C--

Column 6, line 26, insert --fresh-- after "found"

Column 7, line 56, "gravlolens" should read --graveolens--

Column 8, line 44, after "added" insert --a--

Column 9, line 31, "glutamote" should read --glutamate--

Column 10, line 28, delete "in" and insert therefor --the--

Column 10, line 35, delete "unsubstituted"

Signed and Sealed this thirtieth Day of December 1975

[SEAL]

Attest:

RUTH C. MASON
Attesting Officer

C. MARSHALL DANN
Commissioner of Patents and Trademarks